(12) United States Patent
Gupta et al.

(10) Patent No.: US 9,354,918 B2
(45) Date of Patent: May 31, 2016

(54) MIGRATING LOCAL CACHE STATE WITH A VIRTUAL MACHINE

(71) Applicant: International Business Machines Corporation, Armonk, NY (US)

(72) Inventors: Aayush Gupta, San Jose, CA (US); James L. Hafner, Pacific Grove, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 180 days.

(21) Appl. No.: 14/176,202

(22) Filed: Feb. 10, 2014

(65) Prior Publication Data

US 2015/0229717 A1 Aug. 13, 2015

(51) Int. Cl.
*G06F 9/455* (2006.01)
*H04L 29/08* (2006.01)

(52) U.S. Cl.
CPC ........ *G06F 9/45558* (2013.01); *H04L 67/2842* (2013.01); *H04L 67/34* (2013.01); *G06F 2009/4557* (2013.01)

(58) Field of Classification Search
None
See application file for complete search history.

(56) References Cited

U.S. PATENT DOCUMENTS

| 6,934,755 | B1 | 8/2005 | Saulpaugh et al. |
| 7,383,405 | B2 | 6/2008 | Vega et al. |
| 7,900,005 | B2 | 3/2011 | Kotsovinos et al. |
| 8,260,904 | B2 | 9/2012 | Nelson |
| 2004/0162950 | A1* | 8/2004 | Coulson ............. G06F 12/0804 711/141 |
| 2011/0320556 | A1 | 12/2011 | Reuther |
| 2012/0173653 | A1 | 7/2012 | Bland et al. |
| 2013/0081013 | A1 | 3/2013 | Plondke et al. |
| 2013/0198459 | A1* | 8/2013 | Joshi ..................... G06F 12/084 711/130 |
| 2014/0012940 | A1 | 1/2014 | Joshi et al. |
| 2014/0282522 | A1* | 9/2014 | Daly .................. G06F 9/45558 718/1 |

OTHER PUBLICATIONS

Tim Moreton, "A wide-area file system for migrating virtual machines," Technical Report ISSN 1476-2986, University of Cambridge, 2008, 163 pages.
Voorsluys et al., "Cost of Virtual Machine Live Migration in Clouds: A Performance Evaluation," Grid Computing and Distributed Systems Laboratory, 2009, 12 pages.
Arteaga et al., "Dynamic Block-level Cache Management for Cloud Computing Systems," Google, 2012, 2 pages.

(Continued)

*Primary Examiner* — Emerson Puente
*Assistant Examiner* — Jonathan R Labud
(74) *Attorney, Agent, or Firm* — Cantor Colburn LLP; Bryan Butler

(57) ABSTRACT

Embodiments relate to migrating a local cache state with a virtual machine (VM) migration. An aspect includes detecting that a VM executing on a source host machine has been paused as part of a migration of the VM from the source host machine to a target host machine. A state of a first local cache associated with the VM is identified. The first local cache is accessible by the source host machine and includes data previously fetched from a shared storage. Pre-fetch hints that are based on the state of the first local cache are sent to the target host machine prior to the migration completing. The pre-fetch hints are utilized by the target host machine to fetch, from the shared storage, at least a subset of the data stored in the first local cache for storage in a second local cache accessible by the target host machine.

18 Claims, 4 Drawing Sheets

(56) References Cited

OTHER PUBLICATIONS

Sapuntzakis et al., "Optimizing the Migration of Virtual Computers" Computer Science Department, Stanford University, 2002, 14 pages.

B. Nicolae, et al., A Hybrid Local Storage Transfer Scheme for Live Migration of I/O Intensive Workloads, Proceedings of the 21st International Symposium on High-Performance Parallel and Distributed Computing, pp. 85-96 ACM, Jun. 2012.

C. Jo, et al., Efficient Live Migration of Virtual Machines Using Shared Storage, Proceedings of the 9th ACM SIGPLAN/SIGOPS International Conference on Virtual execution Environments, pp. 41-50, ACM, Mar. 2013.

L. Hu, et al., HMDC: Live Virtual Machine Migration Based on Hybrid Memory Copy and Delta Compression, Applied Mathematics & Information Sciences 7, No. 2L, pp. 639-646, Jan. 2013.

S. Akiyama, et al., Fast Wide Area Live Migration with a Low Overhead through Page Cache Teleportation, 2013 13th IEEE/ACM International Symposium on Cluster, Cloud and Grid Computing (CCGrid), pp. 78-82, IEEE, May 2013.

S. Sahani, et al., A Hybrid Approach to Live Migration of Virtual Machines, 2012 IEEE International Conference on Cloud Computing in Emerging Markets (CCEM), 6 pages, IEEE, Oct. 2012.

\* cited by examiner

MIGRATING LOCAL CACHE STATE WITH A VIRTUAL MACHINE

BACKGROUND

Embodiments of the invention relate generally to virtual machine (VM) migration and, more specifically, to migrating a local cache state with a VM migration.

Modern processor architectures have enabled virtualization techniques that allow multiple operating systems and VMs to run on a single physical machine. These techniques often use a hypervisor layer that runs directly on the physical hardware and mediates accesses to physical hardware by providing a virtual hardware layer to the operating systems running in each virtual machine. The hypervisor can operate on the physical machine in conjunction with a "native VM." Alternatively, the hypervisor can operate within an operating system running on the physical machine, in conjunction with a 'hosted VM' operating at a higher software level.

A VM may be migrated from one physical machine (e.g., from a "source host processor") to another physical machine (e.g., to a "target host processor") for a variety of reasons, such as resource constraints on the source host processor or maintenance of the source host processor. In environments where server-side caching is used, a VM migration often results in an initial degradation of performance due to the local cache on the target host processor not having any entries associated with the migrated VM when the VM is restarted on the target host processor.

BRIEF SUMMARY

Embodiments include a method and computer program product for migrating cache state with a virtual machine (VM). A method includes detecting that a VM executing on a source host machine has been paused as part of a migration of the VM from the source host machine to a target host machine. A state of a first local cache associated with the VM is identified. The first local cache is accessible by the source host machine and includes data previously fetched from a shared storage. Pre-fetch hints that are based on the state of the first local cache are sent to the target host machine prior to the migration completing. The pre-fetch hints are utilized by the target host machine to fetch, from the shared storage, at least a subset of the data stored in the first local cache for storage in a second local cache accessible by the target host machine.

Other embodiments include a method for migrating cache state with a VM by detecting that a migration of a VM from a source host machine to a target host machine is in process. Pre-fetch hints are received at the target host machine. The pre-fetch hints are generated by the source host machine based on a state of a local cache associated with the VM and accessible by the source host machine. Data is fetched by the target machine from a shared storage based on the pre-fetch hints. The fetching is performed independently of the migration of the VM from the source host machine to the target host machine. The fetched data is stored in a local cache associated with the VM and accessible by the target host machine.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other features, and advantages of the disclosure are apparent from the following detailed description taken in conjunction with the accompanying drawings in which:

DETAILED DESCRIPTION

Figure 1:
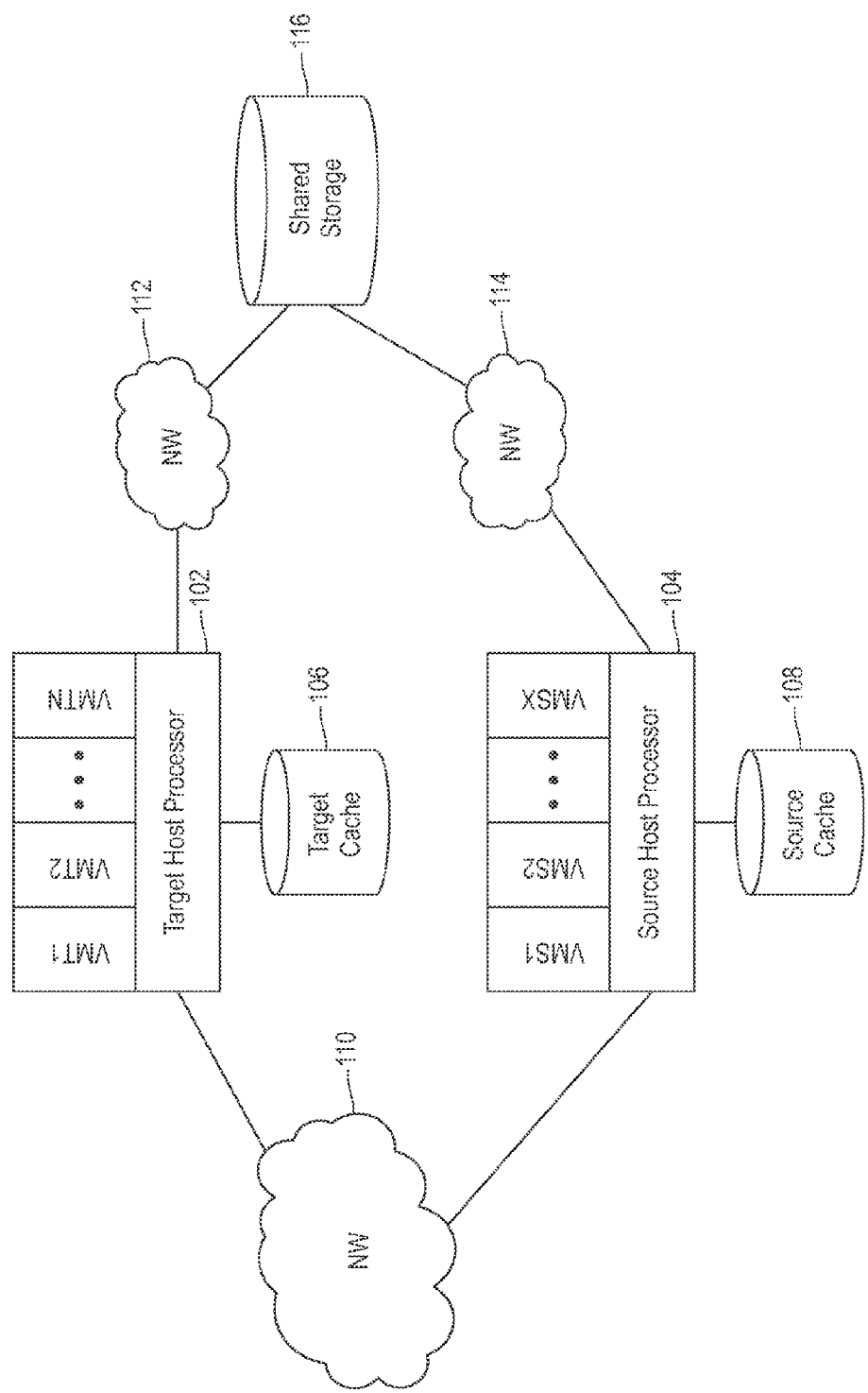
FIG. 1 depicts a system environment for practicing the teachings herein in accordance with an embodiment.

Embodiments described herein are directed to reducing cache misses when a virtual machine (VM) restarts on a new host machine. Embodiments include migrating information about locally cached data associated with a VM when the VM is migrated from a source host processor to a target host processor. In exemplary embodiments, the populating of a target cache (e.g., a local cache that is accessible by the target host processor) with cache data associated with the VM is expedited by providing pre-fetch hints to the target cache prior to the completion of the migration of the VM to the target host machine. The target cache utilizes these pre-fetch hints to pre-fetch data and to warm-up the target cache, thus reducing the number of cache misses by the VM once it restarts on the target host processor. The pre-fetch hints may be sent to the target cache in a plurality of rounds and prior to the VM migration to the target host completing. As used herein, the term "pre-fetch hint" refers to one example of metadata that may be used to describe a current state of a cache. Other examples include, but are not limited to: transfer of actual cached data from source to target, and transfer of list of operations being performed at the source so that the target can apply those operations to fetch the data from shared storage.

In embodiments described herein, a cache state migration application may detect that a VM migration process to move a VM from a source machine to another physical machine has reached a stage where the VM has been paused at the source machine. The pausing indicates that that the VM migration is nearing completion. A state of a local cache associated with the VM is then identified and pre-fetch hints that are based on the state of the local cache are sent to the target machine where the VM is being moved. The target machine may then use the pre-fetch hints to pre-fetch data associated with the migrating VM into a cache that is local to the target machine. In an embodiment, the pre-fetching by the target machine is performed in the background and independently of the migration of the VM.

Pre-fetch hints may also be sent to the target machine when the cache state migration application detects that the migration of the VM has started. In addition, recurring intermediate pre-fetch hints may also be sent to the target machine in between the initial round of pre-fetch hints that are sent based on detecting that the migration has started and the final round of pre-fetch hints that are sent based on detecting that the migration is nearing completion.

Contemporary approaches to avoiding cache re-warming overhead when a VM is migrated to a new host machine include targeted synchronous mirroring of cache resources, shared solid state device (SSD) cache between servers, and keeping the cache location static. Advantages of embodiments described herein when compared to contemporary approaches may include flexibility, low overhead, efficiency, and support for migration of both write-through and write-back caches. For example, unlike synchronous mirroring, embodiments are flexible in that there is no need to pre-decide on a target host. In addition, unlike synchronous mirroring and shared SSD caches, low overhead is achieved by embodiments described herein due to not requiring any additional processing to be performed during the non-migration (e.g., normal operation) phases. Still further, embodiments described herein are more efficient when compared to static caches due to not requiring extra network hops to reach the cache after the VM migration is complete.

Referring now to FIG. 1, a system environment for practicing the teachings herein in accordance with embodiments is generally shown. As shown in FIG. 1, a target host processor 102 and a source host processor 104 are in communication via a network 110. The network 110 may be any type of network known in the art suitable for migrating VMs between the target host processor 102 and the source host processor 104, such as Ethernet, fiber channel and/or InfiniBand.

As shown in FIG. 1, the target host processor 102 is executing "N" VMs and is directly connected (e.g., via a cable, via a wireless connection) to a local cache device, shown in FIG. 1 as target cache 106 (also referred to herein as a "second local cache"). The target cache 106 may be implemented by one or more SSDs to provide server side caches for the VMs executing on the target host processor 102. In embodiment, the target cache 106 is accessible by the target host processor 102 and not accessible by the source host processor 104. In this embodiment, all accesses to contents of the target cache 106 are via the target host processor 102. The target host processor 102 is also in communication with a shared storage 116 via a network 112. The network 112 may be implemented by any network suitable for data transfer such as a storage area network (SAN) or network attached storage (NAS). In an embodiment, the shared storage 116 is accessed by the target host processor 102 via the network 112 as SAN or NAS. All or a portion of the cache data stored in the target cache 106 may be sourced (i.e., previously fetched) from the shared storage 116.

The source host processor 104 shown in FIG. 1 is executing "X" VMs and is directly connected (e.g., via a cable, via a wireless connection) to a local cache device, shown in FIG. 1 as source cache 108 (also referred to herein as a "first local cache"). In another embodiment, the source cache 108 is located on the source host processor 104. The source cache 108 may be implemented by one or more SSDs to provide server side caches for the VMs executing on the source host processor 104. In embodiment, the source cache 108 is accessible by the source host processor 104 and not accessible by the target host processor 102. In this embodiment, all accesses to contents of the source cache 108 are via the source host processor 104. The source host processor 104 is also in communication with the shared storage 116 via a network 114. The network 114 may be implemented by any network suitable for data transfer such as a SAN or NAS. In an embodiment, the shared storage 116 is accessed by the source host processor 104 via the network 114 as SAN or NAS. All or a portion of the cache data stored in the source cache 108 may be sourced (i.e., previously fetched) from the shared storage 116.

The shared storage 116 may be implemented by any storage devices known in the art, such as but not limited to direct access storage devices (DASDs), e.g., hard disk drives (HDDs), solid state drives (SSDs), storage controllers, or tape systems. In an embodiment, the shared storage 116 does not maintain metadata about blocks being accessed by the different VMs. In an embodiment, network 112 and network 114 are implemented as a single network.

Though only two compute nodes (containing, for example a processor and a cache) are shown in FIG. 1, more than two compute nodes may be implemented and capable of accessing the shared storage 116. In addition, a target host processor for a VM migration may be selected from two or more candidate compute nodes based on factors such as capacity, processor speed, and migration cost as is well known in the art.

Figure 2:
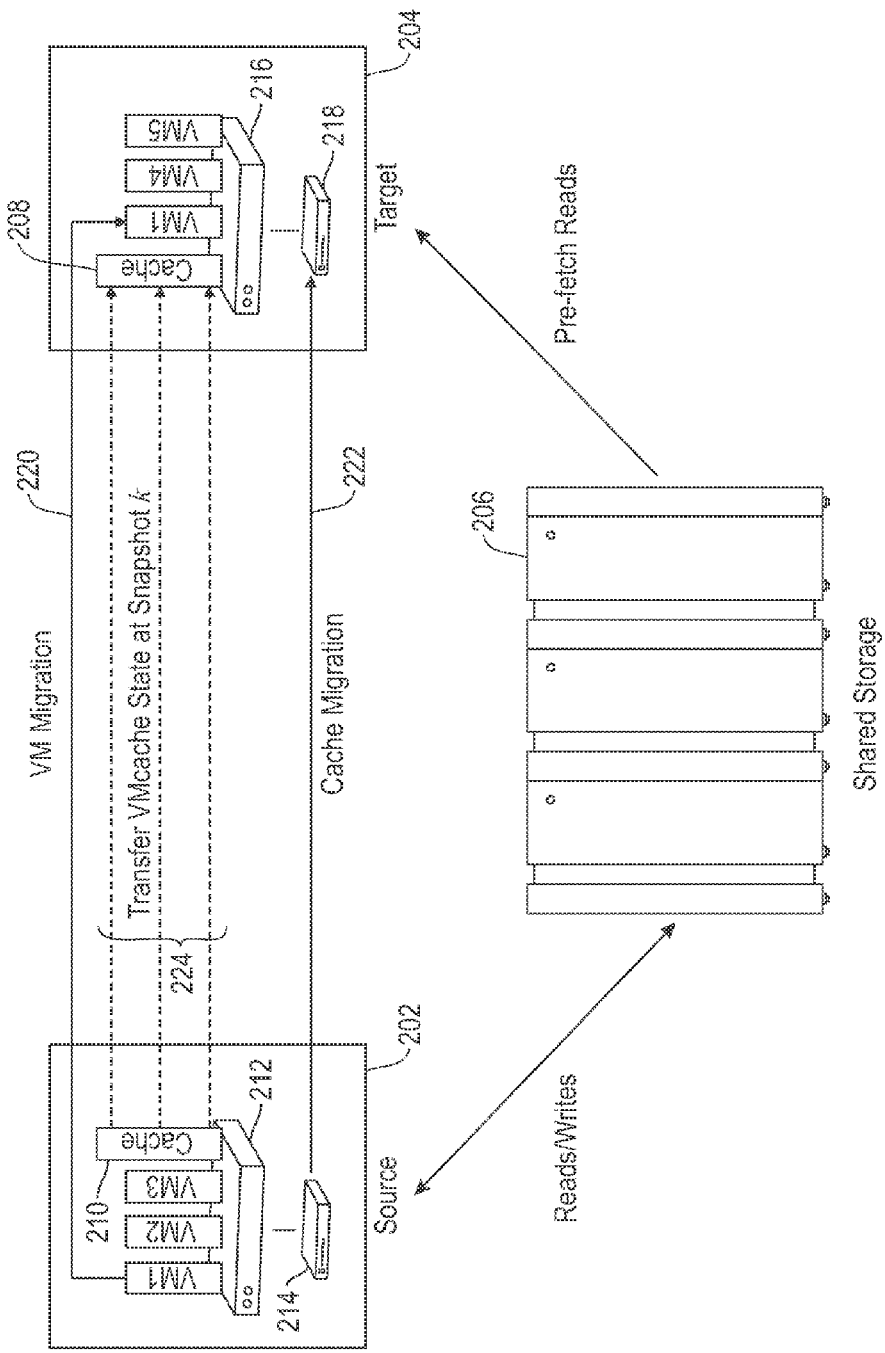
FIG. 2 depicts a process flow for migrating a local cache state along with a virtual machine (VM) migration in accordance with an embodiment.

Referring now to FIG. 2, a process flow for migrating a local cache state along with a VM migration in accordance with an embodiment is generally shown. FIG. 2 depicts a source compute node 202, a target compute node 204, and a shared storage 206. The source compute node 202 includes a source host processor 212 and a source cache 214. The source compute node 202 is executing VM1 (which in the example described herein will be migrated to compute node 204), VM2, VM3 and a source cache state migration application 210. In addition, the source compute node 202 is in communication with the shared storage 206 for accessing shared data. The source cache state migration application 210 may be executing as part of a hypervisor executing on the source compute node 202. Alternatively, the source cache state migration application 210 may be executing as part of a VM executing on the source compute node 202.

The target compute node 204 shown in FIG. 2 includes a target host processor 216 and a target cache 218. In the example described herein, the target host processor 216 will be executing VM1 (once it is migrated from the source compute node 202), VM4, VM5 and a target cache state migration application 208. In addition, the target compute node 204 is in communication with a shared storage 206 for accessing shared data. The target cache state migration application 208 may be executing as part of a hypervisor executing on the target compute node 204. Alternatively, the target cache state migration application 208 may be executing as part of a VM executing on the target compute node 204.

As shown in FIG. 2, cache migration 222 from the source cache 214 to the target cache 218 overlaps in time with the migration VM1 from the source compute node 202 to the target compute node 204. In an embodiment, the cache migration 222 begins execution after the VM migration 220 begins and the cache migration 222 ends prior to the VM migration 220 completing. This timing may be achieved by starting the cache migration 222 based on detecting that the VM migration 220 has started execution, and by completing the cache migration 222 based on detecting that the VM migration has reached a stage where the VM has been paused on the source compute node 204. Also shown in FIG. 2 is the transfer of a plurality of rounds of VM cache states 224 that may be performed as part of the cache migration 222.

Though shown as two separate computer applications, the source cache state migration application 210 and the target cache state migration application 208 may be combined into a single cache state migration application with particular functions being performed, or code segments executed, based on whether the compute node where the application is executing is a target or a source compute node for a VM migration. In an embodiment, one or both of the source cache state migration application 210 and the target cache state migration application 208 may be combined with computer instructions for managing cache accesses during normal system operation of the VM.

In an embodiment, the source cache state migration application 210 receives a notification, or otherwise detects, that a migration of a VM from a source compute node 202 to a target compute node 204 has begun. For example, the source hypervisor may notify the source cache state migration application 210. Another way is for the target hypervisor to inform the target cache state migration application 208 that a new VM is migrating from the source machine. Based on this, the target cache state migration application 208 may request the source cache state migration application 210 to send pre-fetch hints. Based on receiving the notification, the source cache state migration application 210 sends metadata regarding pre-fetch hints about data stored in the source cache 214 (e.g., pointers to data locations in the shared storage 206) to the target cache state migration application 208 executing on the target compute node 204. The target cache state migration application 208 pre-fetches data blocks from the shared storage 206 based on these initial hints and stores the pre-fetched data blocks in the target cache 218. As used herein, the term "block" refers to a group of bits that are retrieved and written to as a unit.

In an embodiment, the source cache state migration application 210 sends one or more rounds of additional pre-fetch hints (also referred to herein as intermediate pre-fetch hints) to the target cache state migration application 208. The sending of these additional pre-fetch hints may cause the target cache state migration application 208 to remove some of the previously pre-fetched blocks from the target cache 218 (e.g., if the source cache state migration application 210 indicates that they are "cold" or otherwise no longer required to be cached). In addition, the sending of additional pre-fetch hints may cause the target cache state migration application 208 to invalidate and re-fetch some of the pre-fetched blocks in the target cache 218 if, for example, they have been overwritten since the last round of hints from the source cache state migration application 210. Further, the sending of additional pre-fetch hints to the target cache state migration application 208 may cause new data blocks to be fetched from the shared storage 206 and stored in the target cache 218 (e.g., the source cache state migration application 210 indicates that the data blocks are "hot" and belong in the target cache 218).

The timing of the sending of the intermediate pre-fetch hints may be based on timeouts (e.g., the source cache state migration application 210 periodically sends pre-fetch hints), or it may be based on the number of updates (e.g., source cache state migration application 210 sends hints after a certain number of updates have happened), or it may be based on requests from the target cache state migration application 208 (e.g., the target cache state migration application 208 may send a request to the source cache state migration application 210 to send the pre-fetch hints once it has finished its last round of fetching from shared storage 206, or periodically). The timing of the sending may be based on a combination of one or more of the above mechanisms.

In an embodiment, the source cache state migration application 210 receives a notification, or otherwise detects, that the VM migration is in a stage where the VM has been paused on the source compute node 204. The source hypervisor may notify the source cache state migration application 210 that the migrating VM has been paused. Based on receiving the notification, the source cache state migration application 210 sends a final round of pre-fetch hints about data stored in the source cache 214 to the target cache state migration application 208 executing on the target compute node 204. In an embodiment, the target cache state migration application 208 pre-fetches data blocks from the shared storage 206 based on these final pre-fetch hints and stores the pre-fetched data blocks in the target cache 218. In an embodiment, where in each round the source cache state migration application 210 sends the complete list of blocks, the target cache 218 may implicitly invalidate blocks which it might have cached (based on earlier rounds) but are not part of the current round of pre-fetch hints. This ensures that the target cache 218 has no stale data. In this way, when the VM starts at the target, it must only service blocks which were part of the final round of hints, and for any other blocks it must refetch them from shared storage 206.

When write-back caching is used by the source cache 214, the source cache state migration application 210 may convert from write-back mode to write-through mode based on detecting that a migration of the VM from the source compute node 202 to the target compute node 204 has begun. As used herein, the term "write-back mode" refers to a mode where the VM may write data to the source cache 214 which will be written back to the shared storage 206 at a later time, and thus, the source cache 214 and the shared storage 206 may store different values for the same storage block. As used herein, the term "write-through mode" refers to a mode where when the VM writes data to the source cache, a copy of the data is also written to the shared storage 206, and thus, the source cache 214 and the shared storage 206 contain the same value for the written storage block. In an embodiment, blocks that were written in write-back mode are de-staged (e.g., written back to the shared storage 206). In this scenario, the initial pre-fetch hints may only include blocks which have the latest state on the shared storage 206 (e.g., those blocks in the source cache 214 that have been de-staged or that were not written to). Invalidation and re-fetching may be reduced by refraining from including in the pre-fetch hints those blocks in the source cache 214 which are being frequently written to until a later round of the pre-fetch hints (e.g., the final pre-fetch hints).

A variety of other scenarios for determining what to send in each round may be implemented based on available resources on the target compute node 204 and the source compute node 202. For example, each round of pre-fetch hints may include pre-fetch hints for all of the data in the source cache 214. In this scenario, the target cache state migration application 208 merges the state, invalidating in the target cache 218 any block that is not on the new list but has already been pre-fetched. This allows for a fixed size metadata transfer and puts the processing burden on the target cache state migration application 208 on the target compute node 204. This may be advantageous, for example, when the target compute node 204 has more resources available than the source compute node 202 during the VM migration process.

Alternatively, each round may include a subset of the pre-fetch hints for the data in the source cache 214. In this scenario, each batch has two parts: new metadata for another set of blocks and corrections to previous rounds (e.g., invalidates or re-fetches for any page whose metadata was sent in a previous round but has changed in the source cache 214). For example, for a four round process, pre-fetch hints for a first quarter of the data in the source cache 214 may be sent in a first round, pre-fetch hints for a second quarter of the data in source cache 214 plus any changes to the first quarter of the data may be sent in a second round, and so on until pre-fetch hints about all of the data in the source cache 214 has been sent (or until the VM migration completes). This approach may help to manage the size of the metadata transfer, at the cost of additional resources on the source compute node 202 to track corrections.

The pre-fetch hints sent by the source cache state migration application 210 to the target compute node 204 may be ordered based on some notion of priority. The priority order may be based on any number of factors such as, but not limited to: recency of access and frequency of access. This may allow the target cache state migration application 208 to make smarter decisions about what blocks it will pre-fetch based, for example on constraints such as available space. The priority order may be used to indicate a suggested fetching order to the target machine.

The size of the list of the pre-fetch hints may be based on mutual agreement between the source and the target. For example, the target cache state migration application 208 may specify a fixed size (e.g., a maximum number of bits per round, a number of pre-fetch hints) for the pre-fetch hints in each round before the first snapshot is sent. In an embodiment, the fixed size is the minimum of the space allocated for the VM in the source cache 214 and the space allocated for the VM in the target cache 218. In an embodiment, the source cache state migration application 210 sends pre-fetch hints for all of the data in the source cache 214 that is related to the migrating VM and the target cache state migration application 208 determines how many of the pre-fetch hints to keep (e.g., based on a priority associated with the pre-fetch hints, based on an order received of the pre-fetch hints, etc.).

Other techniques may also be implemented to improve performance and/or to tradeoff resources. These techniques may include, but are not limited to: list compression; a mechanism to provide fast snapshotting (e.g., to reduce the amount of time that that source cache 214 is unable to service user requests while creating a list of pre-fetch hints for that round); and trading off input/output (I/O) resource usage for performance gains.

Figure 3:
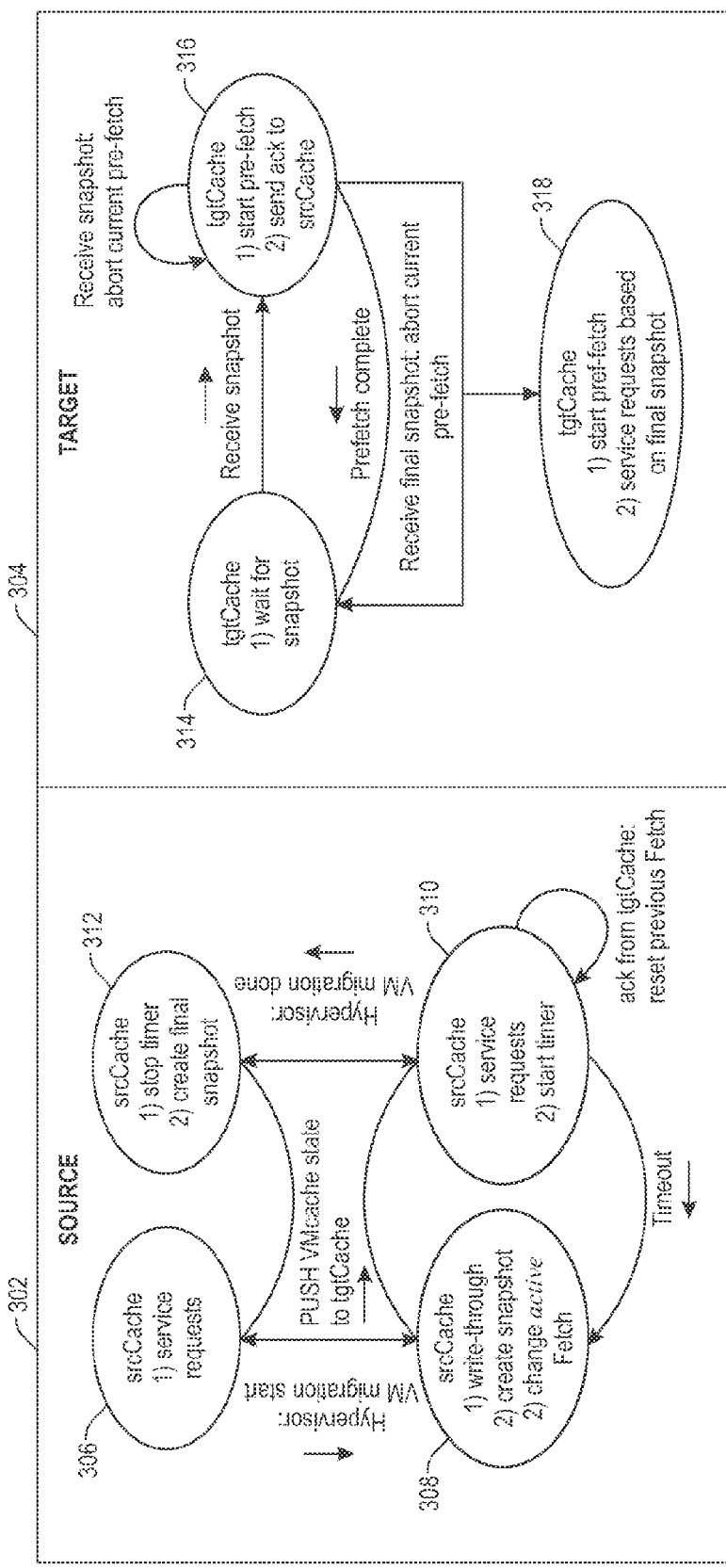
FIG. 3 depicts finite state machines for local cache state migration on a target host processor and a source host processor in accordance with an embodiment.

Referring to FIG. 3, there is shown embodiments of finite state machines for local cache state migration on a target host processor and a source host processor in accordance with an embodiment. As shown in FIG. 3, functions associated with the source cache state migration application 210 and other source cache functions are labeled "srcCache" in FIG. 3. Similarly, functions associated with the target cache state migration application 208 and other target cache functions are labeled "tgtCache" in FIG. 3. FIG. 3 depicts an embodiment of a finite state machine 302 for srcCache which includes functions which execute on a source host processor, and an embodiment of a finite state machine 304 for tgtCache which includes functions which execute on a target host processor.

As shown in the embodiment of the finite state machine 302 for srcCache in FIG. 3, in a first state 306 prior to a VM migration, the srcCache services cache requests for cache that is local to the source compute node. The srcCache enters a second state 308 based on receiving a notification from a hypervisor that a VM migration has started. In the second state 308, the srcCache snapshots the current cache state pertaining to the migrating VM (labeled "VMcache state" in FIG. 3). In an embodiment, the VMcache state includes block numbers and block states (i.e., no block data). In alternative embodiments, the VMcache state may also include actual data values (i.e., block data).

In an embodiment, a block state includes Bit1 (Fetch1) and Bit2 (Fetch2). Fetch is a directive to tgtCache to read the data belonging to the corresponding block number from shared storage. The use of a two bit block state may prevent stale data from being stored in a cache local to the target compute node since only one fetch bit is active for an epoch (i.e., a period between two snapshots or rounds). The Fetch1 and Fetch2 bits may be active in alternate (e.g., odd/even) snapshots. The Fetch1 and Fetch2 bits may be used by the srcCache to determine what metadata to send to the tgtCache.

Embodiments may employ one or more performance optimizations. For example, the srcCache and tgtCache may negotiate the size of the list to be sent to tgtCache. If the size is larger than the size of the cache local to the source host processor, then the srcCache may maintain extra metadata to compensate for the larger size. Another performance optimization that may be performed is the priority ordering of blocks based on access recency, frequency, and other factors. This may allow the tgtCache to make more informed decisions about what blocks it wants to pre-fetch based on available space in the cache local to the target host processor. Other performance optimizations may include list compaction (e.g., compression) to reduce network data for transfers between the srcCache and tgtCache, and fast snapshotting (e.g., pre-computed data structures to create the list quickly on-the-fly) to reduce snapshotting overheads on srcCache performance.

Referring back to FIG. 3, the srcCache enters a third state 310 based on the srcCache pushing the VMcache state to the tgtCache. In the third state 310, after an acknowledgement is received from the tgtCache, the inactive fetch bit is cleared (e.g., Fetch1 for odd snapshot rounds and Fetch2 for even snapshot rounds). In addition, in the third state 310, srcCache keeps servicing the requests through this process due to the presence of the two fetch bits, with the servicing of requests being paused only when the snapshot is created. In an embodiment, the active fetch bit for an epoch (e.g., round) is set for read misses, writes hits and write misses. In an embodiment, this process is optimized by not sending blocks which are being written-to often during intermediate snapshots as they may be likely to be invalidated before the next snapshot. Read hits may only impact the priority ordering since in an embodiment, an active fetch is not set again to prevent unnecessary reads by the tgtCache.

In an embodiment, the repeat snapshotting procedure in the third state is based on a timeout metric. For example, it may be based on a data threshold, a time threshold, and/or a pull request from the tgtCache. In an embodiment where the data threshold metric is used, the srcCache keeps track of the amount of data to be fetched by the tgtCache (e.g., by tracking how much change has happened since a previous snapshot was captured). In an embodiment where the time threshold is used, the srcCache keeps track of the amount of time that has elapsed since the last snapshot.

Referring back to FIG. 3, the srcCache enters a fourth state 312 based on receiving a notification from the hypervisor that that the VM migration switch is about to happen (e.g., the VM on the source host processor has been paused). In an embodiment, the VM is not started on the target host processor until the srcCache sends an acknowledgement that the final state data has been sent to the target host processor. This may be needed to ensure that the srcCache is able to do a synchronous final snapshot procedure (i.e., so that the tgtCache has the final VMcache state which matches the data stored in the cache local to the source host processor). The actual block reads to the shared storage may still happen in the background on the target host processor.

FIG. 3 also shows a finite state machine 304 for the tgtCache instructions which are executed by the source host processor. The tgtCache is in a first state 314 prior to receiving a snapshot from the srcCache. The tgtCache enters a second state 316 based on receiving a snapshot (e.g., a VMcache state) from the srcCache. The tgtCache acknowledges receipt of the VMcache state from the srcCache and starts to pre-fetch the blocks specified in the VMcache state from shared storage in a priority order specified, for example, by the srcCache. In an embodiment, the tgtCache issues reads for blocks in the shared storage which have a fetch bit set in the block state sent by srcCache. The tgtCache may also ensure that at the end of a pre-fetch phase it only has blocks which are part of the latest snapshot sent by the srcCache. If a new snapshot arrives before the previous one is completely pre-fetched, the tgtCache may abandon, or abort, the previous snapshot and start processing the new one. The acknowledgement, pre-fetching, and pre-fetch abandoning are performed at the second state 316 for all intermediate snapshots sent by the srcCache to the tgtCache.

The tgtCache enters a third state 318 based on receiving a final snapshot from the srcCache. In an embodiment, when the VM starts on the target host processor the tgtCache only services requests belonging to the final snapshot. This prevents stale data from being fetched by the tgtCache. In the background, tgtCache may start pre-fetching the blocks belonging to the final snapshot. When the pre-fetch is completed tgtCache re-enters the first state 314.

The previous descriptions of the finite state machines shown in FIG. 3 assume that the local cache on the source host processor is a read-only cache or operating in a write-through mode. In other embodiments, the local cache on the source host processor is a write-back cache. When a write-back cache is used, as soon as notification of a VM migration is received, the local cache may be transformed from a write-back mode to a write-through mode for any subsequent requests. In an embodiment, this does not have an appreciable performance impact because as part of the VM migration to the target host processor, all data from the local cache on the source host processor needs to be stored back to the shared storage before the VM can be started on the target host processor. Also, when the cache is implemented as a write-back cache, the snapshots that are sent to the tgtCache may include only those blocks which have their latest state on shared storage (i.e., clean blocks). This may result in the VMcache state having holes belonging to blocks which have been written to (i.e., "dirty blocks"). In an embodiment, the positions in priority order occupied by dirty blocks are left blank so that the tgtCache knows exactly the position of the clean block that it is fetching. This prevents the tgtCache from fetching blocks which may be far down in the priority order and otherwise wouldn't have been pre-fetched. In an embodiment, the srcCache may start de-staging dirty blocks to shared storage and treat them as "write-hits" in the current epoch in order to ensure relatively the same priority ordering.

Implementing an increased number of rounds may improve performance when the VM starts on the target host processor however, it can also result in wasting resources by increasing I/O to shared storage and requiring extra central processing unit (CPU) cycles. The increased I/O to shared storage may be due to factors such as the re-fetching of stale data by the tgtCache and the eviction of blocks fetched by the tgtCache in previous epochs. This increased resource usage may be mitigated by keeping the number of rounds low (initial and final, or final only). If the cache hit rates are high for the VM being migrated and the workload is read dominant, then any impact to performance should be minimal.

As described herein, cache state migration is different than VM migration in several respects. For example, cache state migration includes block level data migration and not the migration of a state of a VM. Cache state migration is a performance optimization that may result in improved data access speeds at VM start-up on a target machine and it does not have an impact on the correctness of the resulting VM that is executed on the target machine. VM migration where the entire system needs to be moved to the target machine is contrasted with cache state migration where there is no requirement that the entire set of blocks in the source cache be pre-fetched. In cache state migration performance improvements may be realized by pre-fetching only a sub-set of the data into the local cache at the target machine. In addition, unlike VM migration, cache state migration does not require convergence between the local cache at the target machine and the local cache at the source machine before the VM may be started on the target machine.

Figure 4:
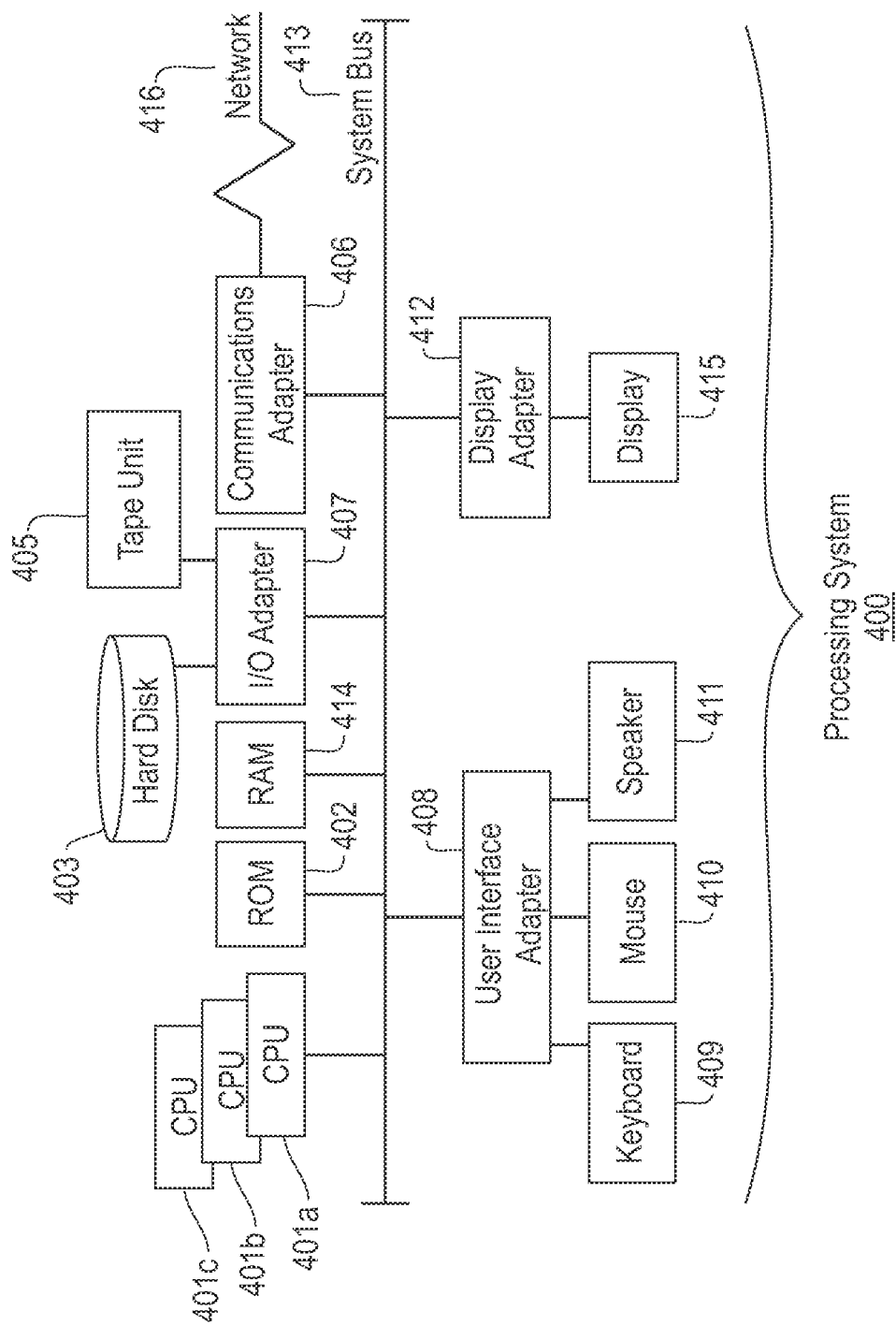
FIG. 4 depicts a processing system for practicing the teachings herein in accordance with an embodiment.

Referring to FIG. 4, there is shown an embodiment of a processing system 400 for implementing the teachings herein. In this embodiment, the system 400 has one or more central processing units (processors) 401a, 401b, 401c, etc. (collectively or generically referred to as processor(s) 401). In one embodiment, each processor 401 may include a reduced instruction set computer (RISC) microprocessor. Processors 401 are coupled to system memory 414 and various other components via a system bus 413. Read only memory (ROM) 402 is coupled to the system bus 413 and may include a basic input/output system (BIOS), which controls certain basic functions of system 400.

FIG. 4 further depicts an input/output (I/O) adapter 407 and a network adapter 406 coupled to the system bus 413. I/O adapter 407 may be a small computer system interface (SCSI) adapter that communicates with a hard disk 403 and/or tape storage drive 405 or any other similar component. I/O adapter 407, hard disk 403, and tape storage device 405 are collectively referred to herein as mass storage 404. A network adapter 406 interconnects bus 413 with an outside network 416 enabling data processing system 400 to communicate with other such systems. A screen (e.g., a display monitor) 415 is connected to system bus 413 by display adaptor 412, which may include a graphics adapter to improve the performance of graphics intensive applications and a video controller. In one embodiment, adapters 407, 406, and 412 may be connected to one or more I/O busses that are connected to system bus 413 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 413 via user interface adapter 408 and display adapter 412. A keyboard 409, mouse 140, and speaker 411 all interconnected to bus 413 via user interface adapter 408, which may include, for example, a Super I/O chip integrating multiple device adapters into a single integrated circuit.

Thus, as configured in FIG. 4, the system 400 includes processing capability in the form of processors 401, storage capability including system memory 414 and mass storage 404, input means such as keyboard 409 and mouse 140, and output capability including speaker 411 and display 415. In one embodiment, a portion of system memory 414 and mass storage 404 collectively store an operating system such as the AIX® or VM operating system from IBM Corporation to coordinate the functions of the various components shown in FIG. 4. In addition, a portion the system memory 414 or hard disk 402 may be used for the local caches described herein, with the shared storage located on a storage device accessible by the processors 401 via the network 416.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

Further, as will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method of migrating cache state with a virtual machine (VM), the method comprising:
    detecting that a migration of a VM from a source host machine to a target host machine has started, the VM executing on the source host machine;
    identifying an initial state of a first local cache associated with the VM, the first local cache accessible by the source host machine and storing data previously fetched from a shared storage;
    sending initial pre-fetch hints to the target host machine, the initial pre-fetch hints based on the initial state of the first local cache, the initial pre-fetch hints utilized by the target host machine to fetch, from the shared storage, at least a subset of the data stored in the first local cache for storage in a second local cache accessible by the target host machine;
    detecting that the VM executing on the source host machine has been paused as part of the migration of the VM from the source host machine to the target host machine;
    based on detecting that the VM executing on the source host machine has been paused, identifying a state of the first local cache;
    comparing the state of the first local cache to the initial state of the first local cache;
    based on the comparing, identifying blocks in the first local cache that have been modified or newly added; and
    prior to the migration completing and subsequent to sending the initial pre-fetch hints, sending pre-fetch hints only for those blocks in the first local cache that have been modified or newly added to the target host machine, the pre-fetch hints utilized by the target host machine to fetch, from the shared storage, at least a subset of the data stored in the first local cache for storage in the second local cache accessible by the target host machine.

2. The method of claim 1, wherein the pre-fetch hints include a priority order to indicate a suggested fetching order to the target host machine.

3. The method of claim 1, wherein the first local cache is not accessible by the target host machine.

4. The method of claim 1, further comprising:
    identifying an intermediate state of the first local cache associated with the VM; and
    sending intermediate pre-fetch hints to the target host machine subsequent to sending the initial pre-fetch hints and prior to sending the pre-fetch hints, the intermediate pre-fetch hints based on the intermediate state of the first local cache.

5. The method of claim 1, wherein the first local cache is a write-back mode cache and the method further comprises converting the first local cache to a write-through mode cache based on the detecting.

6. The method of claim 1, further comprising:
    receiving the pre-fetch hints at the target host machine;
    fetching data from the shared storage based on the pre-fetch hints, the fetching performed independently of the migration of the VM from the source host machine to the target host machine; and
    storing the fetched data in the second local cache associated with the VM and accessible by the target host machine.

7. A computer program product for migrating cache state with a virtual machine (VM), the computer program product comprising:
    a computer readable storage medium having program code embodied therewith, the program code executable by a computer for:
    detecting that a migration of a VM from a source host machine to a target host machine has started, the VM executing on the source host machine;
    identifying an initial state of a first local cache associated with the VM, the first local cache accessible by the source host machine and storing data previously fetched from a shared storage;
    sending initial pre-fetch hints to the target host machine, the initial pre-fetch hints based on the initial state of the first local cache, the initial pre-fetch hints utilized by the target host machine to fetch, from the shared storage, at least a subset of the data stored in the first local cache for storage in a second local cache accessible by the target host machine;
    detecting that the VM executing on the source host machine has been paused as part of the migration of the VM from the source host machine to the target host machine;
    based on detecting that the VM executing on the source host machine has been paused, identifying a state of the first local
    comparing the state of the first local cache to the initial state of the first local cache;
    based on the comparing, identifying blocks in the first local cache that have been modified or newly added; and
    prior to the migration completing and subsequent to sending the initial pre-fetch hints, sending pre-fetch hints only for those blocks in the first local cache that have been modified or newly added to the target host machine, the pre-fetch hints utilized by the target host machine to fetch, from the shared storage, at least a subset of the data stored in the first local cache for storage in the second local cache accessible by the target host machine.

8. The computer program product of claim 7, wherein the pre-fetch hints include a priority order to indicate a suggested fetching order to the target host machine.

9. The computer program product of claim 7, wherein the first local cache is not accessible by the target host machine.

10. The computer program product of claim 7, wherein the program code is further executable by the computer for:
    identifying an intermediate state of the first local cache associated with the VM; and
    sending intermediate pre-fetch hints to the target host machine subsequent to sending the initial pre-fetch hints and prior to sending the pre-fetch hints, the intermediate pre-fetch hints based on the intermediate state of the first local cache.

11. The computer program product of claim 7, wherein the first local cache is a write-back mode cache and the method further comprises converting the first local cache to a write-through mode cache based on the detecting.

12. The computer program product of claim 7, wherein the program code is further executable by the computer for:
    receiving the pre-fetch hints at the target host machine;

fetching data from the shared storage based on the pre-fetch hints, the fetching performed independently of the migration of the VM from the source host machine to the target host machine; and storing the fetched data in the second local cache associated with the VM and accessible by the target host machine.

13. A system for migrating cache state with a virtual machine (VM), the system comprising:

a memory having computer readable computer instructions; and a processor for executing the computer readable instructions, the computer readable instructions including:

detecting that a migration of a VM from a source host machine to a target host machine has started, the VM executing on the source host machine;

identifying an initial state of a first local cache associated with the VM, the first local cache accessible by the source host machine and storing data previously fetched from a shared storage;

sending initial pre-fetch hints to the target host machine, the initial pre-fetch hints based on the initial state of the first local cache, the initial pre-fetch hints utilized by the target host machine to fetch, from the shared storage, at least a subset of the data stored in the first local cache for storage in a second local cache accessible by the target host machine;

detecting that the VM executing on the source host machine has been paused as part of the migration of the VM from the source host machine to the target host machine;

based on detecting that the VM executing on the source host machine has been paused, identifying a state of the first local cache;

comparing the state of the first local cache to the initial state of the first local cache;

based on the comparing, identifying blocks in the first local cache that have been modified or newly added; and prior to the migration completing and subsequent to sending the initial pre-fetch hints, sending pre-fetch hints only for those blocks in the first local cache that have been modified or newly added to the target host machine, the pre-fetch hints utilized by the target host machine to fetch, from the shared storage, at least a subset of the data stored in the first local cache for storage in the second local cache accessible by the target host machine.

14. The system of claim 13, wherein the pre-fetch hints include a priority order to indicate a suggested fetching order to the target host machine.

15. The system of claim 13, wherein the first local cache is not accessible by the target host machine.

16. The system of claim 13, wherein the computer readable instructions further include:

identifying an intermediate state of the first local cache associated with the VM; and sending intermediate pre-fetch hints to the target host machine subsequent to sending the initial pre-fetch hints and prior to sending the pre-fetch hints, the intermediate pre-fetch hints based on the intermediate state of the first local cache.

17. The system of claim 13, wherein the first local cache is a write-back mode cache and the method further comprises converting the first local cache to a write-through mode cache based on the detecting.

18. The system of claim 13, wherein the computer readable instructions further include:

receiving the pre-fetch hints at the target host machine;

fetching data from the shared storage based on the pre-fetch hints, the fetching performed independently of the migration of the VM from the source host machine to the target host machine; and storing the fetched data in the second local cache associated with the VM and accessible by the target host machine.

\* \* \* \* \*